United States Patent [19]
Chang

[11] 4,052,121
[45] Oct. 4, 1977

[54] NONCOLLINEAR TUNABLE ACOUSTO-OPTIC FILTER

[75] Inventor: I-Cheng Chang, Sunnyvale, Calif.

[73] Assignee: Itek Corporation, Lexington, Mass.

[21] Appl. No.: 612,055

[22] Filed: Sept. 10, 1975

[51] Int. Cl.$^2$ ............................ G02F 1/33; G02B 5/20
[52] U.S. Cl. .................................. 350/149; 350/161 W
[58] Field of Search ................. 350/149, 161; 250/199

[56] References Cited

U.S. PATENT DOCUMENTS

| | | | |
|---|---|---|---|
| 3,502,879 | 3/1970 | Vallese | 350/161 |
| 3,679,288 | 7/1972 | Harris | 350/149 |
| 3,698,792 | 10/1972 | Kusters | 350/149 |
| 3,944,334 | 3/1976 | Yano et al. | 350/149 |
| 3,944,335 | 3/1976 | Saito et al. | 350/149 |
| 3,953,107 | 4/1976 | Yano et al. | 350/149 |

OTHER PUBLICATIONS

Dixon, R. W., "Acoustic Diffraction of Light in Anisotropic Media," IEEE Jr. of Quantum Electronics, QE-3, 1967, pp. 85-93.
Yano et al., "New Noncollinear Acousto-Optic Tunable Filter Using Birefringence in Paratellurite," Applied Optics Letters, vol. 24, 3-15-74, pp. 256-258.

*Primary Examiner*—John K. Corbin
*Assistant Examiner*—Wm. H. Punter
*Attorney, Agent, or Firm*—Homer O. Blair; Robert L. Nathans; Gerald H. Glanzman

[57] ABSTRACT

An electronically tunable optical filter is described wherein an optical beam is diffracted by an acoustic beam the group velocity of which is noncollinear with the optical beam transmitted through the birefringent crystal medium. The frequency and the direction of the phase velocity of the acoustic wave are chosen for a given incidence direction of the optical beam so that the diffraction occurs for a band of optical frequencies centered about a predetermined optical frequency and a relatively large angular distribution of incident optical beams. The noncollinear acousto-optic filter has the following advantages: (i) it allows very simple coupling of optical and acoustic beams into the interaction medium, (ii) it allows the use of multiple transducers for increasing tuning range or varying resolution, (iii) it allows a broad class of crystals to be used as filter material, (iv) it has a large degree of freedom in the filter design for optimizing efficiency or angular aperture and throughput, realizing narrow or broad optical passband and (v) it provides the spatial separation of incident and transmitted light through the filter and thus can be operated without the use of polarizers.

20 Claims, 4 Drawing Figures

NONCOLLINEAR TUNABLE ACOUSTO-OPTIC FILTER

BACKGROUND OF THE INVENTION

The present invention relates to electronically tunable optic filters utilizing non-collinear interaction of light and sound beams in an optically anisotropic medium. The term "non-collinearity" defined in this disclosure refers to the energy flow direction (i.e., group velocity) of the optical and acoustic beams.

Electronically tunable acousto-optic filters have been constructed utilizing a polarized light beam propagating collinearly with an acoustic beam in an anisotropic medium. The incident light beam of a first polarization is diffracted by the acoustic wave into a second polarization that may be separated from the incident beam with crossed polarizers. At a fixed acoustic frequency, the diffraction occurs only for a band of optical frequencies around a center optical wavelength determined by the acoustic frequency. When the acoustic frequency is changed, the center wavelength of the optical passband of the filter is correspondingly changed. Such a collinear acousto-optic filter is disclosed in a patent application entitled "Tunable Acousto-Optic Method and Apparatus" filed by Stephen E. Harris and issued as U.S. Pat. No. 3,679,288 on July 25, 1972. Harris was concerned primarily with acoustic wave propagations that are isotropic, i.e., the acoustic wave phase velocity and group velocity are coincident. Thus in the collinear acousto-optic filter described by Harris, both the acoustic beam (i.e., group velocity of the acoustic wave) and the acoustic wavefront normal (phase velocity) are collinear with the optical beam.

The collinearity requirement of Harris' filter brought the two most important benefits: (1) The interaction volume of the acoustic and optical beams is enhanced, thus the drive power for maximum filter transmission is drastically decreased. (2) The angular aperture of the filter is large compared with conventional isotropic Bragg cell.

The above-mentioned patent also gave a mathematical description of the collinear acousto-optic interaction in an anisotropic medium and described the characteristics of the collinear acousto-optic filter that included filter tuning relation (i.e., center wavelength of the filter passband vs. acoustic frequency), transmission and drive power, filter spectral bandwidth and angular aperture. It also described means of coupling of optical and acoustic beams into the filter medium and separation of the filtered light from the incident light beam.

The acoustic wave propagations in some crystals are anisotropic; i.e., the acoustic phase velocity and group or energy velocity are noncollinear. The acoustic beam "walks-off" from the acoustic wavefront normal. For instance, the angle between the phase and group velocities for a shear wave propagating along the y-axis in crystal quartz is equal to 24.3°. For such cases the optical beam cannot be simultaneously collinear with both the phase and group velocities of the acoustic beam. In a patent application entitled "Electronically Tunable Acousto-Optic Filter Having Improved Light and Acoustic Wave Interaction" filed by John A. Kusters and issued as U.S. Pat. No. 3,687,521 on Aug. 29, 1972, a filter construction is described in which the group velocity of the acoustic wave is chosen to be collinear with the optical beam. This configuration has the advantage of maximizing interaction length and consequently the low drive power. Also described in the patent are means of coupling the optical and acoustic beams so that the acoustic group velocity and the optical beam can be collinear inside the interaction medium.

The configuration described in the above-mentioned patent has an undersirable result. The angular aperture of the filter becomes very small. Or equivalently, the passband of the filter is broadened for larger angular apertures. As described in a patent application filed by Donald L. Hammond, John A. Kusters and David A. Wilson and issued as U.S. Pat. No. 3,756,689 on Sept. 4, 1973, certain crystal orientations exist where the effect of birefringence change is cancelled out by the effect due to acoustic anisotropy. Choosing these directions for acousto-optic filters in the configuration described in the above-cited U.S. Pat. No. 3,687,521, enhanced resolution and improved angular aperture is obtained. Also described in the U.S. Pat. No. 3,756,689 are the specific crystal orientations for crystal quartz and LiNbO$_3$.

In all of the above-cited patents (U.S. Pat. Nos. 3,679,288; 3,687,521 and 3,756,689) the configuration of the acousto-optic filters are described so that the acoustic beam (i.e., the group or energy velocity of the acoustic wave) is substantially collinear with the light.

SUMMARY OF THE INVENTION

In the present invention it has been discovered that an electronically tunable optical filter with large angular aperture can be obtained by utilizing the interaction of optical and acoustic beams that propagate non-collinearly in an anisotropic medium. Methods and apparatus are provided so that the incident light of one polarization is diffracted by the acoustic wave into an orthogonal polarization over an optical passband, the center of which can be tuned by changing the acoustic frequency. The present invention provides the design relationship between directions of incident light and acoustic phase velocity, and crystal orientations for the appropriate filter operation with large angular aperture. The present invention describes a configuration in which the optical beam and the acoustic beam (i.e., group velocity of the acoustic wave) are noncollinear; this allows simple constructions for coupling optical and acoustic beams into the medium.

One feature of the present invention is that the transmitted light beam can be separable from the incident light beam by the use of polarizers and analyzers.

One additional feature of the present invention is that a broader class of crystals can be used as the filter medium.

Another additional feature of the present invention is that it allows a large degree of freedom in the design. The various designs include optimization of filter characteristics such as efficiency, resolution, angular aperture and total throughput, as well as freedom of choice of acoustic frequency for a given operating wavelength.

Another additional feature of the present invention is that the configuration allows more than one transducer to be bonded to the filter medium for increasing tuning range or varying resolution.

Another additional feature of the present invention is that the transmitted and incident beam are separated spatially by a deflection angle. For incident light with an angular distribution less than the deflection angle, the filter can be operated without the use of polarizers and analyzers.

DESCRIPTION OF THE PREFERRED EMBODIMENT

Figure 1:
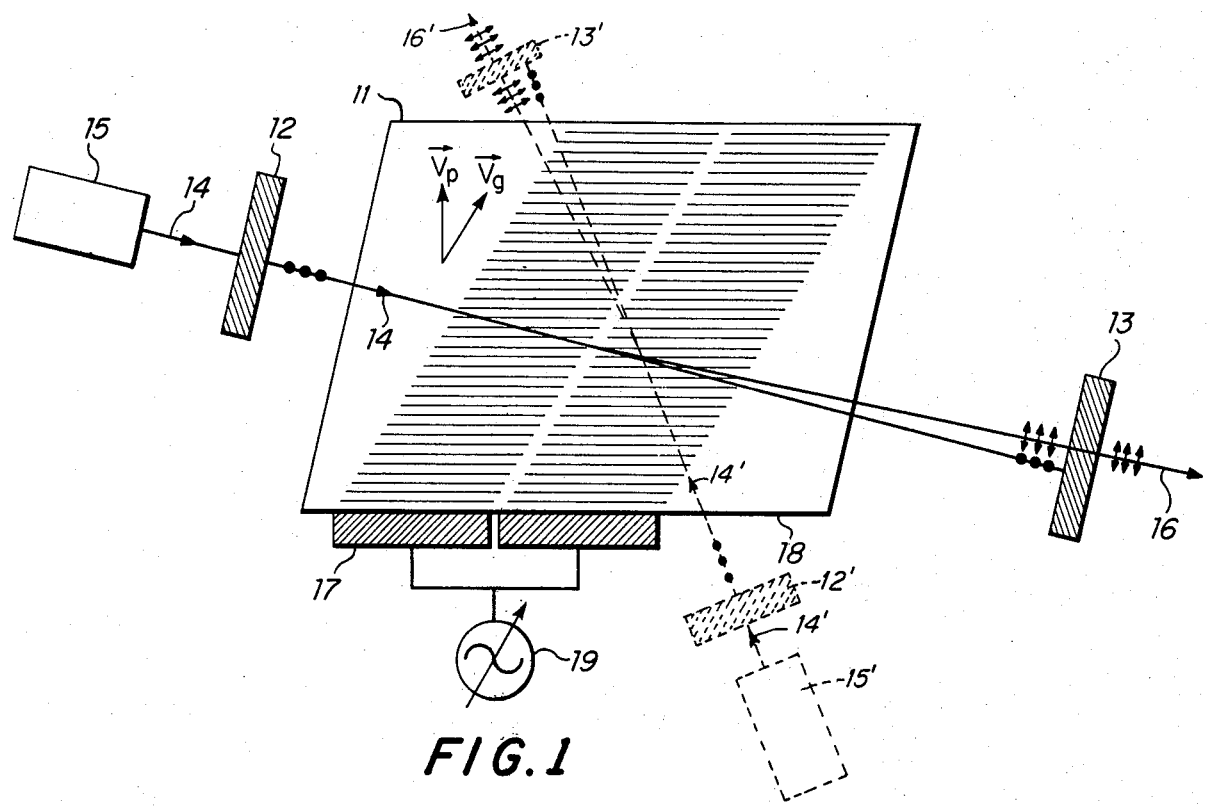
FIG. 1 is a schematic representation of a noncollinear tunable acousto-optic filter construction in accordance with the present invention.

Referring to FIG. 1, a configuration of the noncollinear tunable acousto-optic filter of the present invention is shown diagrammatically. The filter comprises a suitable optical anisotropic medium such as a birefringent crystal 11, an input polarizer 12 and an output analyzer 13. The optical beam 14 from a light source 15 is polarized by the input polarizer 12, enters the medium 11, propagates along a predetermined axes of the birefringent crystal, passes out the opposite face of medium 11 as the output 16, and then passes through the output polarizer or analyzer 13.

One or more acoustical transducers 17 (two transducers are shown in the figure) are mounted in intimate contact with the crystal 11 on a predetermined surface 18 and is connected to a suitable generator or source 19, such as a voltage controlled oscillator, the frequency and amplitude of which can be varied. The transducer can be longitudinal (e.g., 35° y-cut $LiNbO_3$) or shear (e.g., x-cut $LiNbO_3$). The wave normal of the generated acoustic wave is along the phase velocity $\vec{V}_p$. The group velocity of the acoustic wave $\vec{V}_g$ (i.e., the direction of the acoustic energy flow) is chosen to be noncollinear with the light beam 14. For longitudinal modes and certain specific shear modes the acoustic wave propagation is isotropic (i.e., the acoustic phase velocity $\vec{V}_p$ and group velocity $\vec{V}_g$ are collinear). The acoustic phase velocity $\vec{V}_p$ is then also noncollinear with the optical beam 14.

As illustrated in solid line in FIG. 1, the transducers may be mounted to a different surface of the crystal than that through which the light beam enters the crystal or, alternatively, and as illustrated by the dotted line optical path with corresponding primed reference numbers, the transducers may be mounted on the same face of the crystal but displaced therefrom.

For many shear modes the acoustic phase velocity $\vec{V}_p$ is noncollinear with the group velocity. In this case the acoustic phase velocity $\vec{V}_p$ can be chosen noncollinear with the optical beam (as shown in FIG. 1) or collinear with the optical beam.

Figure 2:
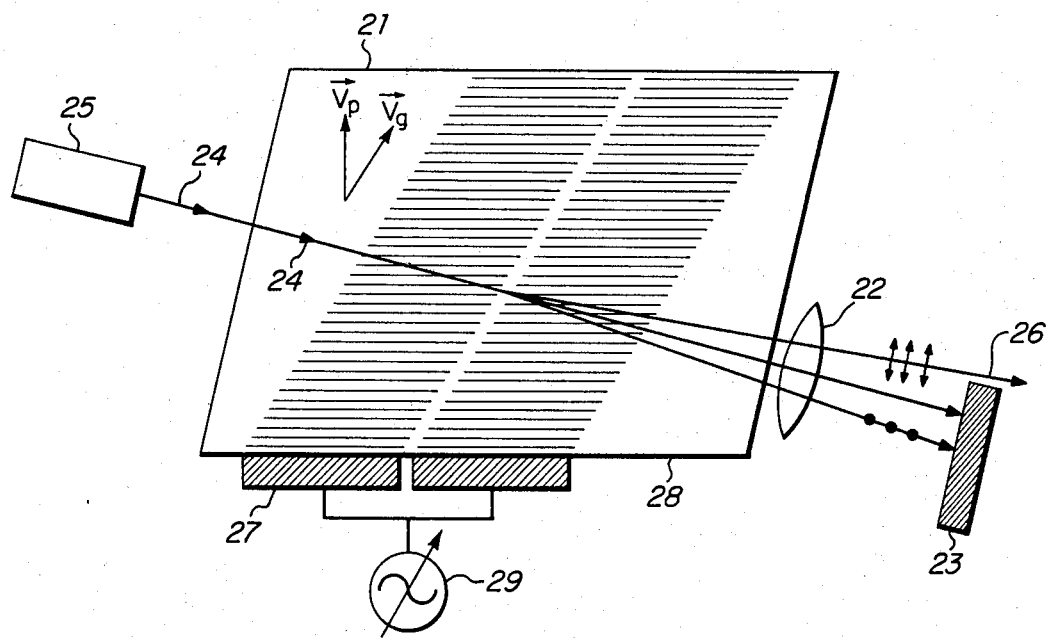
FIG. 2 is a schematic representation of another embodiment of the invention.

Referring to FIG. 2, another configuration of the filter that includes the filter medium 21, a lens 22 and a stop 23. The optical beam 24 from a light source 25 passes through the medium 21 and is diffracted by the acoustic beam. The lens 22 and the field stop 23 are used for spatial filtering purposes so that only one of the diffracted optical beams is allowed to transmit as the output beam 26. One or more acoustical transducers are mounted in intimate contact with the medium 21 on a predetermined surface 28 and is connected to a suitable generator 29. The acoustic phase velocity is along $\vec{V}_p$ which may be either collinear or noncollinear with the acoustic group velocity $\vec{V}_g$.

For a given acoustic mode and acoustic phase velocity $\vec{V}_g$ can be determined by the acoustic characteristics of the crystal. The choice of the direction of the acoustic phase velocity $\vec{V}_p$ is made in such a way so that the filter can be operated with a large angular aperture. To arrive at the appropriate relation between the acoustic phase velocity $\vec{V}_p$ and the direction of optical beam, a theory is needed for the light diffraction by acoustic waves in an anisotropic medium where the wavefront normal of the optical and acoustic waves are in general noncollinear. The following is a detailed explanation of the theory of the filter of the present invention.

Acousto-optic diffraction can be viewed as a parametric interaction. Via the elastooptic effect, the incident optical wave with angular frequency $\omega_i$ and wavevector $\vec{K}_i$ mixes with the acoustic wave with angular frequency $\omega_a$ and wavevector $\vec{k}_a$ to generate a forcing optical polarization wave with angular frequencies $\omega_o + \omega_a$ and wavevector $\vec{k}_o + \vec{k}_a$. The polarization wave then interacts with the free waves (i.e., the diffracted wave) in the anisotropic medium. The angular frequency and wavevector of the diffracted wave is denoted by $\omega_d$ and $\vec{k}_d$ which is given by $$\omega_d = \omega_i + \omega_a \qquad (1)$$

$$\vec{k}_d = \vec{k}_i + \vec{k}_a + \Delta\vec{k} \qquad (2)$$

Eq. (1) is a statement of conservation of energy and Eq. (2) is a statement of momentum conservation. The difference of wavevectors $\Delta \vec{k}$ between the polarization wave $\vec{k}_i + \vec{k}_a$ and the diffracted wave $\vec{k}_d$ represents the mismatch in momentum and is responsible for the decrease of diffraction efficiency from the central wavelength of the filter transmission where the momentum is exactly matched. Notice that $\omega_a << \omega_i$, thus $$\omega_i \approx \omega_d = \frac{2\pi c}{\lambda_o},$$

where $c$ is the velocity of light and $\lambda_o$ is the freespace wavelength. Also notice that $$k_i = \frac{2\pi}{\lambda_o} n_i \text{ and } k_d = \frac{2\pi}{\lambda_d} n_d$$

where $n_i$ and $n_d$ are the refractive indices of the medium for the incident and diffracted light respectively, and $$k_a = \frac{2\pi f_o}{V},$$

where $f_o$ is the acoustic frequency and $V$ is the acoustic velocity.

Under nearly matching conditions, i.e., when the mismatch wavevector $\Delta k$ is small, the interaction of the driving polarization wave and the free wave of medium results in an increase of the diffracted light. The fractional diffracted light intensity at an interaction length $L$ is given by $$T = \frac{I_d(L)}{I_i(O)} = T_0 \left[ \frac{\sin\left(\frac{\Delta kL}{2}\right)}{\frac{\Delta kL}{2}} \right]^2 \quad (3)$$

where $T_o$ is the peak transmission at the passband center wavelength, $$T_o = \sin^2\left(\frac{\pi L}{\lambda_o}\sqrt{\frac{M_2 P_d}{2}}\right) \quad (4)$$

where $P_d$ is the acoustic power density, and $M_2$ is a material figure of merit for the particular mode of acousto-optic interaction, $M_2$ is given by $$M_2 = \frac{n_i^3 n_d^3}{\rho V^3} p^2 \quad (5)$$

where $\rho$ is the density of the crystal, $p$ is the appropriate elasto-optic coefficient for the particular mode of interaction.

Eq. (4) states that 100 percent transmission can be obtained when the power density reaches the value $$P_d = \frac{1}{2M_2}\left(\frac{\lambda_o}{L}\right)^2 \quad (6)$$

For low drive power it is desirable to have long interaction length and large figure of merit $M_2$. It is important to note that to obtain diffraction the relevant elasto-optic coefficient $p$ must not vanish. However, for many crystal classes, $p$ might be zero for a particular chosen mode. A notable example is $TeO_2$. When it is used as a deflector the figure of merit of $TeO_2$ is $M_2 \simeq 2 \times 10^{-15}$ cgs units. On the other hand the figure of merit $M_2$ for crystalline quartz used in the collinear filter configuration is about $2 \times 10^{-19}$ cgs units. If $TeO_2$ could be used in the collinear filter, the drive power reduction would be a factor of $10^4$! However, the relevant $p$ for filter interaction is zero for the collinear filter configuration. In fact the relevant $p$ for collinear filters is not zero only for crystals with relatively low symmetry (trigonal crystals, e.g., crystal quartz, and $LiNbO_4$ and tetragonal II, e.g., $CaMoO_4$). Moreover, even for those crystal classes the relevant $p$ is in general quite small. Thus, although the interaction length L may be smaller in the noncollinear configuration, much broader classes of crystals with large $M_2$ are applicable for noncollinear acousto-optic filters. For noncollinear filter configurations, any material that is anisotropic (uniaxial and biaxial of all crystal classes) is applicable.

Returning now to Eq. (3), it is seen that when the wavelength is deviated from the bandcenter of the filter, it introduces a finite $\Delta k$ and gives rise to a finite optical passband of the filter transmission. The center wavelength of the filter is determined by the condition of exact momentum matching ($\Delta k = 0$).

Figure 3:
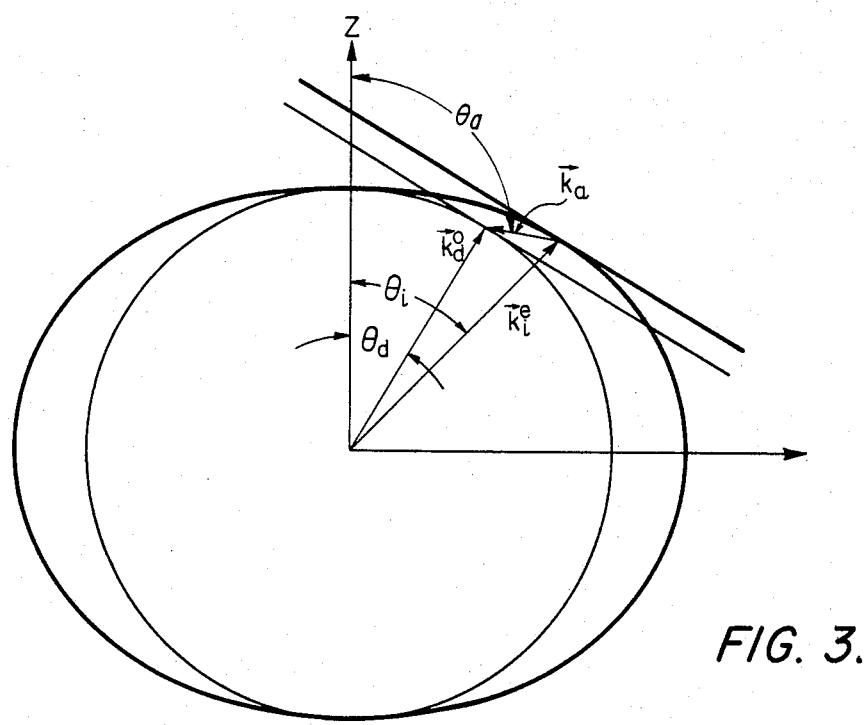
FIG. 3 is a wavevector diagram for acousto-optic interaction in a noncollinear filter. The figure shows that the magnitude and direction of the acoustic wave-vector must be so chosen that the tangents to the optical wave-vector loci are parallel.

Moreover, the filter must be operated with a large angular aperture (i.e., the spectral resolution of the filter must not be broadened for a finite angular distribution of the incident light). It is necessary that the momentum matching condition must be maintained for a small change of incident light directions. Thus, to insure proper operation of the filter, the magnitude and direction of the acoustic wavevector $\vec{k}_a$ must be chosen so that the following conditions are satisfied: (1) the momentum is matched, $\Delta k = 0$, i.e., the wavevectors $\vec{k}_i$, $\vec{k}_d$ and $\vec{k}_a$ must form a closed triangle. (2) The first order change of $\Delta k$ with respect to change of incident light directions is zero, i.e., $$\frac{\delta}{\delta \phi_i}\Delta k = 0 \text{ and } \frac{\delta}{\delta \phi_i}\Delta k = 0,$$

where $\phi_i$ and $\theta_i$ are azimuth and polar angles of the incident light beam. Geometrically this means that the tangents to the locus of $\vec{k}_i$ and $\vec{k}_d$ are parallel. For purposes of illustration it is assumed that the incident light is an extraordinary polarized beam and the diffracted light is an ordinary polarized beam. i.e., $$n_d = n_o, \text{ and } n_i = \left(\frac{\cos^2\Theta_i}{n_o^2} + \frac{\sin^2\Theta_i}{n_e^2}\right)^{\frac{1}{2}},$$

where $n_o$ and $n_e$ are respectively the refractive indices for the ordinary and extraordinary rays propagated perpendicular to the optic axis. In the $\theta$ = constant plane the locus of $\vec{k}_i$ and $\vec{k}_d$ are concentric circles, the tangents to the locus are parallel when $$\phi_i = \phi_d = \phi_a \quad (7)$$

where $\phi_d$ and $\phi_a$ are the azimuth angles of the diffracted optical beam and the acoustic wave, respectively. Eq. (7) means that the wavevectors $\vec{k}_i$, $\vec{k}_d$ and $\vec{k}_a$ all lie in the same azimuth plane ($\phi$ = constant). The wavevector diagram in the $\phi$ = constant plane is shown in FIG. 3. It is seen that the locus of the wavevector $\vec{k}_d$ for the extraordinary polarized beam is approximately elliptical. Thus the condition that the tangents to the locus of $\vec{k}_i$ and $\vec{k}_d$ are parallel can be satisfied for any given incident light angle $\theta_i$ if the acoustic wavevector $\vec{k}_a$ is properly chosen. From the wavevectors geometry shown in FIG. 3, it can be shown that (when the birefringence $\Delta n = n_i - n_d$ is small)

$$\tan(\theta_a - \theta_i) = \frac{1}{\Delta n}\left(\frac{\delta \Delta n}{\delta \theta_i}\right) \quad (8)$$

Furthermore, the condition $\Delta k = 0$ yields $$k_d^2 = k_i^2 + k_a^2 - 2k_i k_a \cos(\theta_a - \theta_i) \quad (9)$$

Eqs. (8) and (9) gives the approximate relation between the optical wavelength of the filter passband and the acoustic wavelength, $$f_o = \frac{V}{\lambda_o}\left\{(\Delta n)^2 + \left(\frac{\delta \Delta n}{\delta \theta_i}\right)^2\right\}^{\frac{1}{2}} \quad (10)$$

Notice that the diffracted and the incident light beam in the non-collinear acousto-optic filter are separated by the angle $$\Delta\theta \approx \frac{\delta}{\delta\theta_i} \Delta n.$$

Thus the filter can be operated without the use of polarizers and analyzers if the useful angular aperture of the filter is less than the deflection angle as given by Eq. (8).

It should be remarked that for the noncollinear filters both the spectral resolution and the angular aperture are functions of $\theta_i$, and are thus variable with different choices of operating incidence angles.

It should be emphasized that the acoustic mode can be either isotropic or anisotropic. In any case, a crystal orientation for the incidence light (the polar and azimuth angles) can be selected to provide a large degree of freedom in the filter design.

Figure 4:
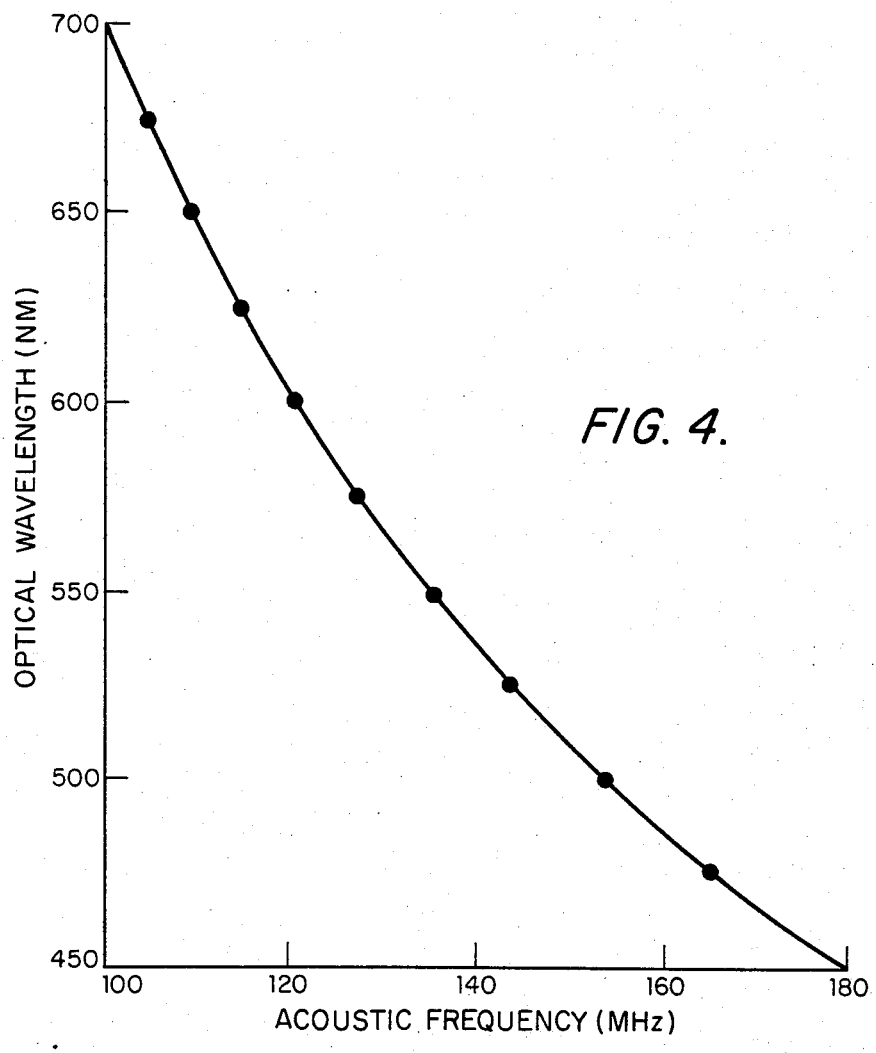
FIG. 4 is a graph showing the measured tuning curve of a $TeO_2$ noncollinear acousto-optic filter.

The following is a description of experimental work on the noncollinear tunable acousto-optic filters. In one experiment a noncollinear acousto-optic using $TeO_2$ as the filter medium was design and constructed. The schematic of the filter is same as shown in FIG. 1. Linearly polarized light is normally incident to the entrance surface which makes a 20.7° with the (001) plane. The chosen acoustic wave is a pure shear mode propagating in the (110) plane and making an angle of 10° from the [110] axes. This propagation direction is chosen according to Eqs (7) and (8). The transducer used is an X-cut $LiNbO_3$ transducer with a resonant frequency at about 145 MHz. The acoustic energy column walks off at an angle of 64.3° from the [110] axes. By changing the acoustic frequency from 100 to 180 MHz, tuning of the optical passband from 750 to 450 nm was obtained. The measured tuning curve of the $TeO_2$ filter, shown in FIG. 4 was obtained using a tungsten lamp and a monochromster. The measured tuning curve is in good agreement with Eq. (10). The half-power bandwidth of the filter was measured to be about 33A at 632.8 nm. The angular aperture of the filter was determined to be about ±7°. About 95 percent corrected peak transmission was measured when the input electrical power was about 120 mW. In another experiment the same $TeO_2$ was tested without the use of polarizers and analyzers. The experiment setup is the same as shown in FIG. 2. At an input angular aperture of $f/10$, the filter rejection was found to be about 33 dB. The deflection angle between the incident and diffracted light measured at 632.8 nm was found to be about 5.8°.

While what has been described above are the presently most preferred embodiments, it should be understood that the invention can take many other forms. For example, the light diffracting structure described could be used in other applications, for example, as a modulator, in addition to being used as a filter. Because many additions, modifications and alterations can be made without departing from the present invention, it should be understood that the invention should be limited only insofar as required by the scope of the following claims.

I claim:

1. A method for diffracting an incident light beam with a first polarization to a deflected light beam of second polarization that is orthogonal to the first polarization, said method comprising the steps of exciting an acoustic wave in an optically birefringent crystal; passing the light beam through said crystal in a direction that is noncollinear with the group velocity of the acoustic wave; and selecting the direction of the acoustic wave such that the acoustic wavevector is in the same azimuth plane as the wavevector of the incident light, and in the said azimuth plane, the tangents to the locus of the wave-vectors for the incident and diffracted light are parallel.

2. The method of claim 1 and further including the step of varying the frequency of the acoustic wave to vary the center wavelength of the optical passband of the diffracted light beam.

3. The method of claim 1 and including the step of choosing different propagation directions of the incident light beam to vary the center wavelength and the bandwidth of the optical passband for a prescribed acoustic frequency.

4. A method for diffracting an incident nonpolarized light beam into two deflected light beams with mutually orthogonal polarizations, the said deflected light beams being spatially separated from each other and from the incident light beam, said method comprising the steps of exciting an acoustic wave in an optically birefringent crystal; passing the incident light beam through said crystal in a direction that is noncollinear with the group velocity of the acoustic wave; and, for at least one of said deflected light beams, selecting the direction of the acoustic wave such that the acoustic wavevector is in the same azimuth plane as the wavevector of the incident light, and in the said azimuth plane, the tangents to the locus of the wavevectors for the incident and diffracted light are parallel.

5. The method of claim 4 and further including the step of varying the frequency of the acoustic wave to vary the center wavelength of the optical passband of the diffracted light beam.

6. The method of claim 4 and including the step of choosing different propagation directions of the incident light beam to vary the center wavelength and the bandwidth of the optical passband for a prescribed acoustic frequency.

7. Apparatus for diffracting an incident light beam with a first polarization to a deflected light beam of second polarization that is orthogonal to the first polarization, said apparatus comprising: means for exciting an acoustic wave in an optically birefringent crystal; and means for passing a light beam through said crystal in a direction that is noncollinear with the group velocity of the acoustic wave, the direction of the acoustic wave being selected such that the acoustic wavevector is in the same azimuth plane as the wave-vector of the incident light, and in the said azimuth plane, the tangents to the locus of the wavevectors for the incident and diffracted light are parallel.

8. Apparatus of claim 7 including means for varying the frequency of the acoustic wave to vary the center wavelength of the optical passband of the diffracted light.

9. Apparatus of claim 7 including means for selecting different propagation directions of the incident light and the acoustic wave to vary the center wavelength and the bandwidth of the optical passband for a prescribed acoustic frequency.

10. Apparatus as in claim 7 wherein said means for exciting an acoustic wave comprises at least one acoustical transducer bonded to the said birefringent crystal on a face thereof that makes an angle with respect to the face thereof through which said incident light beam enters said crystal.

11. Apparatus as in claim 7 wherein said means for exciting an acoustic wave comprises at least one acoustical transducer bonded to the said birefringent crystal on the same face of said crystal through which said light beam enters said crystal but displaced therefrom.

12. The apparatus of claim 7 wherein the said birefringent crystal is Tellurite Oxide ($TeO_2$).

13. The apparatus of claim 7 wherein said apparatus comprises an electronically tuned optical filter.

14. Apparatus for diffracting an incident nonpolarized light beam into two deflected light beams with mutually orthogonal polarizations, the said deflected light beams being spatially separated from each other and from the incident light beam, said apparatus comprising: means for exciting an acoustic wave in an optically birefringent crystal; and means for passing an incident light beam through said crystal in a direction that is noncollinear with the group velocity of the acoustic wave, for at least one of said deflected light beams, the direction of the acoustic wave being selected such that the acoustic wave-vector is the same azimuth plane as the wavevector of the incident light, and in the said azimuth, plane, the tangents to the locus of the wavevectors for the incident and diffracted light are parallel.

15. Apparatus of claim 14 including means for varying the frequency of the acoustic wave to vary the center wavelength of the optical passband of the diffracted light.

16. Apparatus of claim 14 including means for selecting different propagation directions of the incident light to vary the center wavelength and the bandwidth of the optical passband for a prescribed acoustic frequency.

17. Apparatus as in claim 14 wherein said means for exciting an acoustic wave comprises at least one acoustical transducer bonded to the said birefringent crystal on a face thereof that makes an angle with respect to the face thereof through which said incident light beam enters said crystal.

18. Apparatus as in claim 14 wherein said means for exciting an acoustic wave comprises at least one acoustical transducer bonded to the said birefringent crystal on the same face of said crystal through which said light beam enters said crystal but displaced therefrom.

19. The apparatus of claim 14 wherein the said birefringent crystal is Tellurite Oxide ($TeO_2$).

20. The apparatus of claim 14 wherein said apparatus comprises an electronically tuned optical filter.

* * * * *